(12) United States Patent
Huffer et al.

(10) Patent No.: US 8,365,644 B2
(45) Date of Patent: Feb. 5, 2013

(54) RECIPROCATING SAW BLADE FOR CUTTING DRYWALL

(76) Inventors: Brian J. Huffer, Aliso Viejo, CA (US); Emmett J. Ebner, Coto De Caza, CA (US)

( * ) Notice: Subject to any disclaimer, the term of this patent is extended or adjusted under 35 U.S.C. 154(b) by 809 days.

(21) Appl. No.: 12/174,777

(22) Filed: Jul. 17, 2008

(65) Prior Publication Data
US 2009/0049973 A1 Feb. 26, 2009

Related U.S. Application Data

(60) Provisional application No. 60/965,673, filed on Aug. 21, 2007.

(51) Int. Cl.
B23D 49/00 (2006.01)
B23D 57/00 (2006.01)
B27B 3/28 (2006.01)
B27B 19/09 (2006.01)
B27B 19/00 (2006.01)
B27B 3/26 (2006.01)
B27B 19/04 (2006.01)
B27B 13/02 (2006.01)

(52) U.S. Cl. ............... 83/835; 83/848; 30/369; 30/393; 30/394

(58) Field of Classification Search ............ 83/835–855, 83/660, 698.61; 30/329, 392, 355, 514, 517, 30/369, 350, 393, 394
See application file for complete search history.

(56) References Cited

U.S. PATENT DOCUMENTS

| | | | | |
|---|---|---|---|---|
| 45,009 A * | 11/1864 | Alexander | ....................... | 30/144 |
| 4,870,757 A * | 10/1989 | Kirkpatrick et al. | ............ | 30/344 |
| 5,095,623 A * | 3/1992 | Williams | ....................... | 30/144 |
| 5,103,565 A * | 4/1992 | Holzer, Jr. | ....................... | 30/392 |
| 5,517,889 A * | 5/1996 | Logan | ............................. | 83/835 |
| D371,820 S * | 7/1996 | Thompson | .................... | D22/118 |
| 5,711,079 A * | 1/1998 | Fischer et al. | .................. | 30/342 |
| D409,269 S * | 5/1999 | Carson et al. | ............... | D22/118 |
| 6,244,152 B1 * | 6/2001 | Di Nicolantonio | ............ | 83/835 |
| D446,571 S * | 8/2001 | Frazer | ......................... | D22/118 |
| 6,427,573 B1 * | 8/2002 | Carlsen et al. | .................. | 83/835 |
| 6,497,046 B1 * | 12/2002 | Bardeen et al. | ................. | 30/517 |
| D473,911 S * | 4/2003 | Green | ......................... | D22/118 |
| 6,735,876 B2 * | 5/2004 | Hirabayashi | .................... | 30/392 |
| D496,425 S * | 9/2004 | Carter, III | .................... | D22/118 |
| D496,575 S * | 9/2004 | Carter, III | ....................... | D8/99 |
| D497,531 S * | 10/2004 | Carter, III | ....................... | D8/99 |
| 6,810,589 B2 | 11/2004 | Lagaly et al. | | |
| 7,188,425 B2 | 3/2007 | Bednar et al. | | |
| 7,257,900 B2 * | 8/2007 | Wheeler et al. | ................. | 30/392 |
| 2003/0010179 A1 * | 1/2003 | McLuen | ........................ | 83/848 |

* cited by examiner

Primary Examiner — Ghassem Alie
Assistant Examiner — Bharat C Patel
(74) Attorney, Agent, or Firm — Stetina Brunda Garred & Brucker

(57) ABSTRACT

There is provided a replaceable drywall saw blade capable of reciprocating in-line when mounted to a hand held reciprocating power saw. The blade includes a generally planar body member having a generally linear top edge and a generally parallel opposed bottom edge. The blade further includes a generally linear upper piercing edge angularly offset downwardly from the top edge. The blade additionally includes a generally linear lower piercing edge angularly offset upwardly from the bottom edge. The upper piercing edge and lower piercing edge intersect to form a forward point on said blade. A mounting aperture is also formed on the blade for releasably securing the blade to the hand held reciprocating power saw.

20 Claims, 2 Drawing Sheets

RECIPROCATING SAW BLADE FOR CUTTING DRYWALL

CROSS-REFERENCE TO RELATED APPLICATIONS

The present application claims priority to Provisional Application No. 60/965,673 filed on Aug. 21, 2007 entitled Reciprocating Saw Blade, the entire contents of which is incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to saw blades and more particularly, to a saw blade for use with a reciprocating saw for cutting drywall.

2. Description of the Related Art

Drywall is widely used in the construction industry for both residential and commercial construction. Sheets of drywall may be pre-fabricated at an off-site location and delivered to the construction site. The drywall sheets may be quickly and easily attached to the structural frame to form a wall, ceiling, or other surface.

After the drywall is attached to the structural frame, it may be necessary to cut the drywall. For instance, an electrician may cut through the drywall to install recessed lighting in a ceiling. In addition, a plumber may cut through the drywall to access plumbing located behind the drywall. Various demolition projects may also require cutting or removal of certain sections of drywall.

Conventional drywall cutting tools may be used to cut through the drywall. A typical drywall cutter includes a blade that is 4"-9" in length. A common problem associated with usage of such drywall cutting tools is that when the blade is inserted into the drywall, the blade may cut or damage utilities located behind the drywall. For instance, the blade may cut or damage electrical lines, plumbing, or other utilities disposed behind the drywall. Contact between the blade and the utilities may also place the individual cutting the drywall at risk of injury (e.g. electrical lines, gas lines). In addition, such contact may also create considerable damage, which may be very costly to fix. In the case of a hired contractor, the cost of repair may be greater than the profit expected for the original project.

Another problem associated with conventional drywall cutters relates to the dust generated when cutting the drywall. In particular, conventional drywall cutters tend to generate significant amounts of dust or debris when cutting the drywall. A standard sheet of drywall includes an inner chalky layer disposed between a pair of opposing outer paper-like layers. When the blade travels through the inner chalky layer, it has a propensity to pull chunks of the inner chalky layer out of the drywall sheet, which causes dust to settle in the areas surrounding the drywall. As such, the dusted areas typically require cleaning once the drywall is cut. The cleanup adds unwanted time and expense to the construction project.

As is apparent from the foregoing, there exists a need in the art for a drywall cutting blade configured to mitigate contact with utilities disposed behind the drywall as well as to reduce the dust generated with cutting the drywall. The present invention addresses this particular need, as will be discussed in more detail below.

BRIEF SUMMARY OF THE INVENTION

According to an aspect of the present invention, there is provided a replaceable drywall saw blade capable of reciprocating in-line when mounted to a hand held reciprocating power saw. The blade includes a generally planar body member having a generally linear top edge and a generally parallel opposed bottom edge. The blade further includes a generally linear upper piercing edge angularly offset downwardly from the top edge. The blade additionally includes a generally linear lower piercing edge angularly offset upwardly from the bottom edge. The upper piercing edge and lower piercing edge intersect to form a forward point on said blade. The blade also includes a mounting aperture connected to the body member for releasably securing the blade to the hand held reciprocating power saw.

The blade may be sized and configured to mitigate contact between the blade and utilities which may be disposed behind the drywall. In this manner, the blade may be configured to be inserted into the drywall, with a minimal amount of the blade being completely advanced therethrough. In addition, the blade may minimize the amount of dust generated during insertion and removal of the blade into and out of the drywall. In this regard, the at least one tooth may be configured to cut through an outer layer of the drywall to mitigate the amount of dust produced when cutting the drywall.

The blade may include at least one saw tooth is formed in the bottom edge. The blade may further include an upper piercing edge and a lower piercing edge that intersect at a right angle. Furthermore, the blade may include a plurality of saw teeth. In addition, the thickness of the blade may be substantially uniform along its length.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
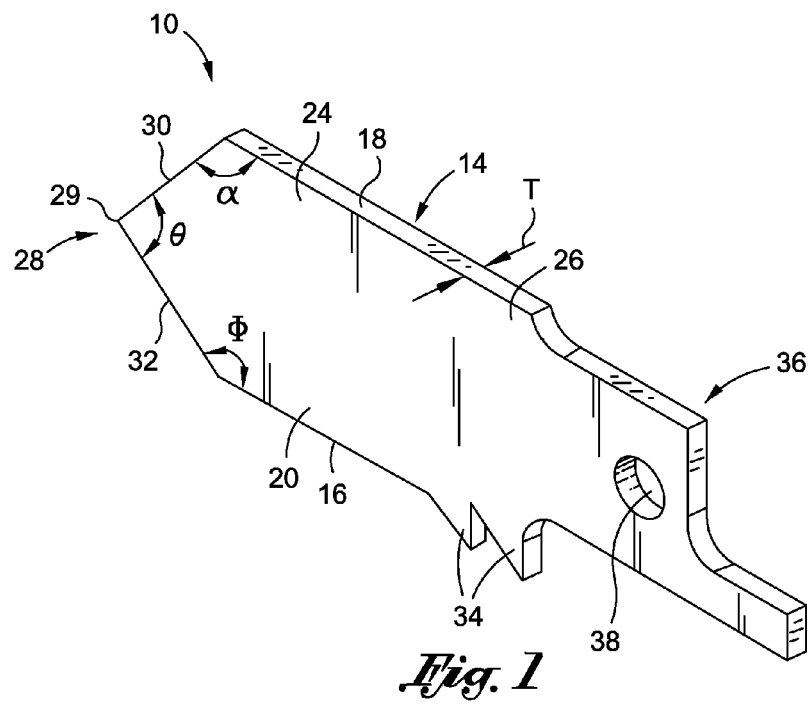
FIG. 1 is an upper perspective view of a blade for use with a reciprocating saw to cut drywall, the blade having a blade body, a blade tip, a pair of teeth, and an engagement element.

Referring now to the drawings wherein the showings are for purposes of illustrating a preferred embodiment of the present invention only, and not for purposes of limiting the same, FIGS. 1-6 illustrate a drywall cutting blade 10 constructed in accordance with an embodiment of the present invention. Various aspects of the invention are directed toward a blade 10 configured to reduce the amount of dust produced when cutting the drywall 40. Furthermore, other aspects of the invention are directed toward mitigating contact between the blade 10 and utilities which may be disposed behind the drywall 40, such as plumbing and electrical lines.

The blade 10 is configured for use with a reciprocating saw 12 for cutting drywall 40. As used herein, a reciprocating saw 12 is a tool that is engageable with a cutting instrument (such as a blade 10) to drive the cutting instrument through a cutting cycle. In most cases, the reciprocating saw repeatedly pushes and pulls the blade 10 through a cutting material. It is understood that reciprocating saws 12 are commonly employed in construction and demolition projects. The size and shape of the reciprocating saw 12 may vary. Reciprocating saw 12 are readily available in handheld and cordless models, as well as high-speed, high-power corded models. An exemplary reciprocating saw 12 is the DeWalt Heavy-Duty 10.0 Amp Reciprocating Saw manufactured by DeWalt, headquartered in Baltimore, Md.

Figure 2:
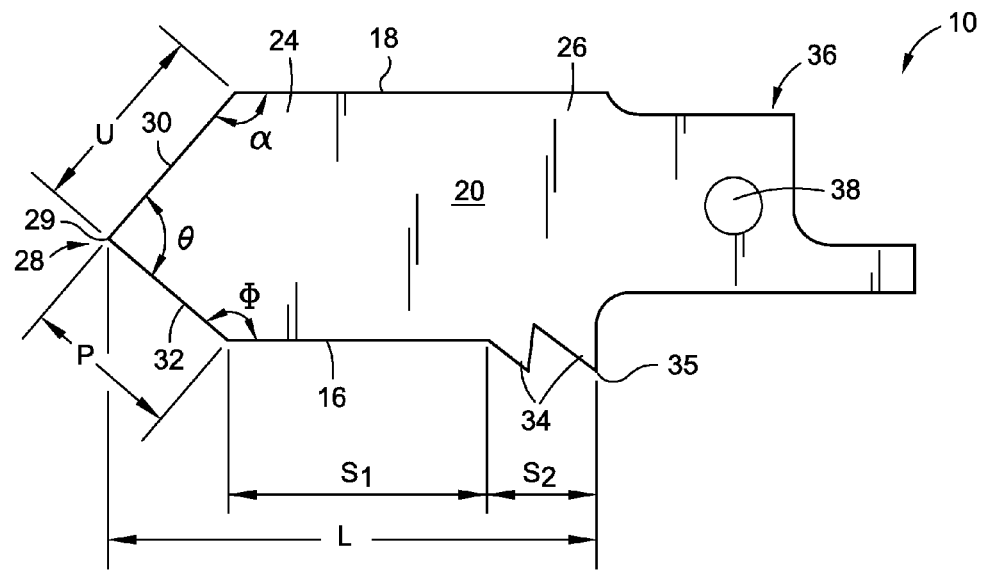
FIG. 2 is a side elevation view of the blade illustrated in FIG. 1.

Referring now specifically to FIGS. 1 and 2, the blade 10 includes a blade body member 14 defining a body leading portion 24 and a body engagement portion 26. As used herein, the body engagement portion 26 refers to that portion of the blade body 14 that is disposed closest to the reciprocating saw 12 when the blade 10 is connected thereto. Furthermore, the leading portion 24 refers to that portion of the blade body 14 that is farthest from the saw 12 when the blade 10 is connected thereto. The body leading portion 24 is also that portion of the body member 14 that is initially inserted into the drywall 40.

The blade body 14 includes a body top edge 18 and an opposing body bottom edge 16. The body top and bottom edges 18, 16 extend along the blade body 14 between the blade engagement portion 26 and the blade leading portion 24. It may be desirable for the body top and bottom edges 18, 16 to be substantially planar to facilitate insertion and removal of the blade 10 from the drywall 40. Furthermore, in one embodiment, the top and bottom edges 18, 16 are substantially parallel (as shown in FIGS. 1 and 2). However, it is understood that the body top and bottom edges 18, 16 may also define a non-parallel configuration. Furthermore, it is understood that insertion and removal of blade 10 into and out of the drywall 40 may further be facilitated by smooth, planar body top and bottom edges 18, 26.

The blade 10 further includes a pair of opposing lateral surfaces 20 extending along the length of the blade 10. The lateral surfaces 20 extend between the body top edge 18 and the body bottom edge 16. The distance between the opposing lateral surfaces 20 defines a blade thickness "T." In one embodiment, the blade thickness T is substantially uniform. For instance, in one particular embodiment, the blade thickness T is approximately 0.05 inches. However, the thickness T may vary without departing from the spirit and scope of the present invention.

Given that the blade 10 is configured to cut drywall 40 through repeated insertion and removal of the blade 10 through the drywall 40, it is desirable to form the blade body 14 out of a strong, durable material. In one particular embodiment, the blade body 14 is formed of steel. However, other materials known by those skilled in the art may also be used.

The blade 10 includes a blade tip 28 for piercing through the drywall 40 upon insertion of the blade 10 into the drywall 40. The blade tip 28 is connected to the body leading portion 24. In one embodiment, the blade tip 28 is integrally formed with the blade body 14. The blade tip 28 includes an upper piercing edge 30 connected to the body top edge 18 to define an upper tip angle $\alpha$ therebetween. The blade tip 28 further includes a lower piercing edge 32 connected to the body bottom edge 16 to define a lower tip angle $\phi$ therebetween. The upper piercing edge 30 and the lower piercing edge 32 intersect at a forward point 29 to define a primary tip angle $\theta$. In one embodiment, and as depicted in the figures, the primary tip angle is 90 degrees. In other words, the upper piercing edge 30 is substantially orthogonal to the lower piercing edge 32. Accordingly, the upper and lower tip angles $\alpha$, $\phi$ are obtuse in nature. In this regard, the upper and lower tip angles $\alpha$, $\phi$ are greater than 90 degrees but less than 180 degrees.

The upper piercing edge 30 defines an upper piercing length "U," defined as the distance between the forward point 29 and the intersection between the upper piercing edge 30 and the body top edge 18. The lower piercing edge 32 defines a lower piercing length "P," defined as the distance between the forward point 29 and the intersection between the lower piercing edge 32 and the body bottom edge 16. According to various embodiments, the upper piercing length U and the lower piercing length P may vary. For instance, in one embodiment, the upper piercing length U is greater than the lower piercing length P. However, in another embodiment, the upper piercing length U is less than the lower piercing length P. Furthermore, in an additional embodiment, the upper piercing length U and the lower piercing length P are substantially identical.

The blade tip 28 may be formed of strong durable material capable of penetrating through the drywall 40. In one embodiment, at least a portion of the blade tip 28 is formed of a carbide material (e.g. tungsten carbide, titanium carbide). Carbide may be desirable because of its tendency to remain sharp after repeated use. In another embodiment, the blade tip 28 may be formed of steel or other materials known by those skilled in the art. In this manner, the blade tip 28 may be formed of the same or different material used to form the blade body 14.

According to one aspect of the invention, the blade 10 also includes one or more teeth 34 for cutting a portion of the drywall 40. The teeth 34 are connected to the engagement portion 26 of the blade body member 14. As shown in FIGS. 1 and 2, the blade 10 includes a pair of teeth 34 connected to the engagement portion 26 at the body bottom edge 16. However, it is understood that the size, shape, and number of teeth 34 may vary. For instance, when cutting thicker pieces of drywall 40, larger teeth 34 may be desirable. As shown in FIG. 2, bottom edge 16 defines a non-serrated first segment $S_1$ and teeth 34 define a serrated second segment $S_2$. The interaction between the teeth 34 and the drywall 40 will be described in more detail below.

The distance between the forward point 29 and the most rearward tooth 34 defines an operative blade length "L," as depicted in FIG. 2. As is clearly shown in FIG. 2, in the exemplary embodiment, the operative blade length L extends from the forward point 29 to a proximal end 35. It is understood that utilities, including but not limited to, electrical wiring and plumbing may be disposed behind a sheet of drywall 40. When the blade 10 is advanced through the drywall 40 for purposes of cutting the drywall 40, there is a risk of contacting the utilities. Contact between the blade 10 and the utilities may damage the utilities as well as create a safety hazard. For instance, if the blade 10 contacts a live electrical wire, the user may be electrocuted. In addition, if a blade 10 punctures a plumbing line, the surrounding areas may become flooded. Consequently, considerable time and money may be expended to repair damage caused by inadvertent contact between the blade 10 and the utilities. Therefore, by minimizing the operative blade length L, contact between the blade 10 and utilities disposed behind the drywall 40 may be mitigated. It is understood that various embodiments of the present invention include a blade length L that is considerably less than conventional saw blades. In this manner, it is less likely that the blade 10 will contact utilities disposed behind the drywall 40. It is also understood that the blade length L may vary according to the thickness of the drywall 40. For instance, for thicker pieces of drywall 40, a larger blade length L may be desired.

The blade 10 additionally includes an engagement element 36 connected to the engagement portion 26 of the blade body member 14. The engagement element 36 is sized and configured to be engageable with the reciprocating saw 12. Many conventional reciprocating saws 12 engage with a blade 10 by way of a through-hole formed in the blade 10. Accordingly, the embodiment illustrated in FIGS. 1 and 2 includes a mounting aperture 38 for engagement with a reciprocating saw 12. The mounting aperture 38 extends between the opposing lateral surfaces 20 of the blade 10. It is understood that the engagement element 36 may take on other configurations without departing from the spirit and scope of the present invention.

Figure 3:
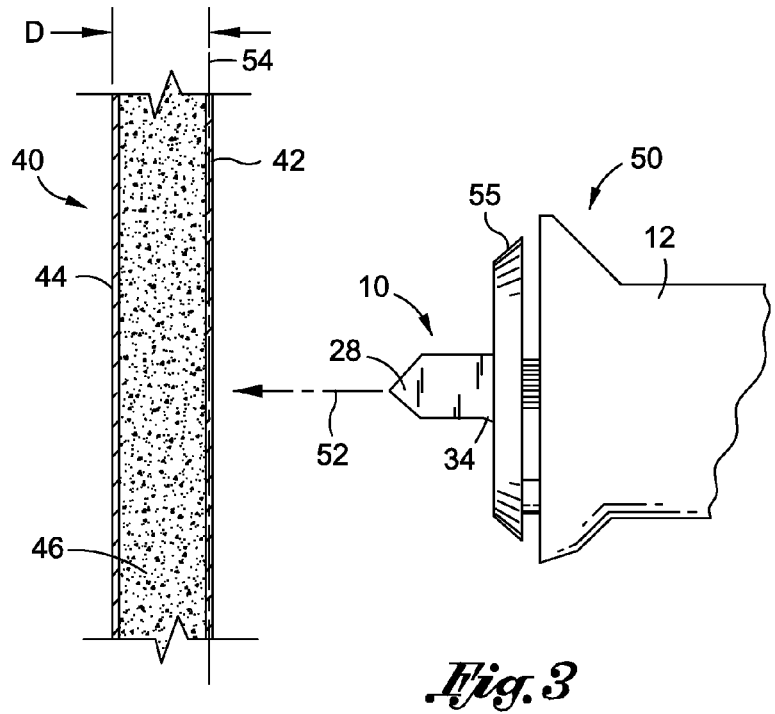
FIG. 3 is a side elevation view of the blade connected to a reciprocating saw to define a saw-blade assembly, with the blade positioned for insertion into a section of drywall, the drywall having a first outer layer and an opposing second outer layer with an inner layer disposed therebetween.
Figure 4:
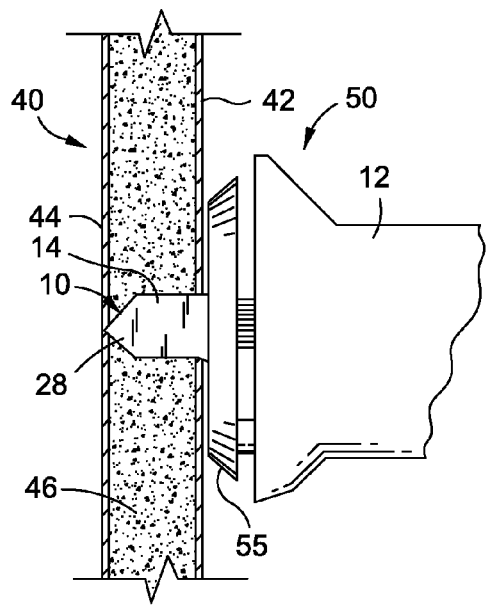
FIG. 4 is a side elevation view of the saw-blade assembly illustrated in FIG. 3, with the blade advanced into the drywall.
Figure 5:
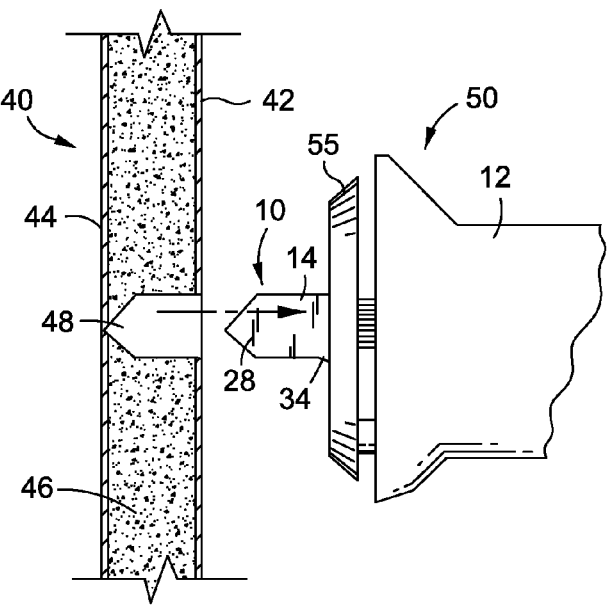
FIG. 5 is a side elevation view of the saw-blade assembly illustrated in FIG. 4, with the blade removed from the drywall.

Referring now to FIGS. 3-5, there is illustrated a sequence of blade positions relative to a section of drywall 40 during operation of the blade 10. The blade 10 is operable to cut drywall 40 upon repeated blade 10 insertion and removal into and out of the drywall 40. Conventional drywall 40 includes a first outer layer 42 and an opposing second outer layer 44. The first and second outer layers 42, 44 are generally formed from a paper-like material. The drywall 40 includes a drywall inner layer 46 disposed between the opposing first and second outer layers 42, 44. The inner layer 46 typically includes a chalky material that tends to generate a substantial amount of dust as the blade 10 is advanced and removed therethrough. Conventional drywall 40 is typically manufactured in a number of standard thicknesses. The drywall thickness "D" is defined by the distance between the first outer layer 42 and the second outer layer 44. Drywall 40 having a thickness of ¼ inch, ½ inch, or ⅝ inch, is commonly used in the construction industry.

FIG. 3 depicts a blade-saw assembly 50 including a blade 10 connected to a reciprocating saw 12 having a saw guard 55. The blade-saw assembly 50 is positioned to cut the drywall 40. In this regard, the blade 10 is positioned to enter the drywall 40 through the first outer layer 42. The blade 10 is inserted into the drywall 40 along an insertion axis 52. According to one embodiment, the insertion axis 52 is substantially orthogonal to a drywall axis 54 defined by the first outer layer 42. In this manner, the blade-saw assembly 50 is held substantially orthogonal to the plane of the drywall 40 when cutting the drywall 40.

Referring now to FIG. 4, the saw 12 is pressed toward the drywall 40 to cause the saw guard 55 to be disposed adjacent the first outer layer 42. Furthermore, the blade 10 is advanced through the drywall 40 to cause the blade tip 28 to pass through the first outer layer 42 and the drywall inner layer 46. The blade tip 28 also comes in contact with the second outer layer 44. In one embodiment, the blade tip 28 may be configured to completely pass through the second outer layer 44. This may be desirable to make a cleaner and more efficient cut of the drywall 40. However, in another embodiment, the blade tip 28 may not pass completely through the second outer layer 44. It may be desirable to mitigate complete blade tip 28 penetration through the second outer layer 44 to protect against inadvertent contact with utilities. For instance, if a user knows, or has good reason to believe that utilities are disposed adjacent the second outer layer 44, then full penetration of the second outer layer 44 by the blade tip 28 may be undesirable.

Once the blade 10 reaches its fully advanced position, it retracts through the drywall 40. Upon retraction, the teeth 34 may cut through the first outer layer 42 to facilitate removal of the blade 10 from the drywall 40. The cutting of the first outer layer 42 by the teeth 34 mitigates bunching of the first outer layer 42. In other words, if the first outer layer 42 is not cut by the teeth 34, the first outer layer 42 has a tendency to gather and disrupt cutting of the drywall 40. The smooth and planar body upper and lower edges 18, 16 enable the blade 10 to glide through the drywall inner layer 46, which mitigates the amount of dust generated by cutting the drywall 40.

It is contemplated that one particular embodiment of the blade 10 does not include blade teeth 34. Alternatively, the blade 10 may include blade teeth 34 that are not advanced into the drywall 34. In this manner, the blade 10 does not have to be inserted to a point where the teeth 34 at least pass through the first outer layer 42. Rather, the blade 10 may be inserted until the blade tip 28 contacts the second outer layer 44. Once the blade tip 28 achieves penetration through the second outer layer 44, further insertion is not required. This may be desirable when it is known that utilities are disposed in close proximity to the second outer layer 44. By minimizing the penetration depth, the chance of puncture or other damage to the utilities is reduced. Another benefit to the blade 10 not having teeth 34 is that the blade 10 may cut the drywall 40 in two directions. More specifically, the blade 10 may cut the drywall 40 along the body upper edge 18, or alternatively along the body lower edge 16.

When making the cut through the drywall 40, the user presses the saw 12 against the drywall 40 to keep the saw guard 55 adjacent the first outer layer 42. The user may also direct the saw 12 to in a direction to perform the desired cut. In this manner, the blade 10 reciprocates through the drywall 40 to make the cut. Once the user completes the desired cut, the blade 10 is removed from the drywall 40, as illustrated in FIG. 5.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A replaceable drywall saw blade capable of reciprocating in-line when mounted to a hand held reciprocating power saw for cutting drywall defining a drywall thickness between a first drywall outer layer and a second drywall outer layer, said blade comprising:

a body member having a first body edge and an opposed second body edge;

a generally linear first piercing edge angularly offset from the first body edge;

a generally linear second piercing edge angularly offset from the second body edge, wherein the first piercing edge and second piercing edge intersect to form a forward point on said blade; and a mounting aperture connected to the body member for releasably securing the blade to the hand held reciprocating power saw;

wherein the second body edge defines a non-serrated first segment extending from the second piercing edge and transitioning into a serrated second segment which terminates at a proximal end;

wherein the blade defines a length equal to the distance between the forward point and the proximal end of the second body edge along an axis defined by the second body edge, the length being no greater than twice the drywall thickness.

2. The replaceable drywall saw blade of claim 1 wherein the first piercing edge and the second piercing edge intersect at a right angle.

3. The replaceable drywall saw blade of claim 1 wherein the generally linear first piercing edge and the first body edge intersect to form an obtuse angle.

4. The replaceable drywall saw blade of claim 1 wherein the generally linear second piercing edge and the second body edge intersect to form an obtuse angle.

5. The replaceable drywall saw blade of claim 1 wherein the second piercing edge defines a second piercing length equal to the distance between the forward point and the second body edge, and the first piercing edge defines a first piercing length equal to the distance between the forward point and the first body edge, the first piercing length being larger than the second piercing length.

6. The replaceable drywall saw blade of claim 1 wherein the generally planar body member includes a pair of opposing lateral body surfaces extending between the first body edge and the second body edge, the pair of opposing lateral body surfaces defining a blade thickness.

7. The replaceable drywall saw blade of claim 6 wherein the blade thickness is substantially uniform.

8. The replaceable drywall saw blade of claim 1 further including at least one saw tooth formed in the serrated segment of the second body edge.

9. The replaceable drywall saw blade of claim 8 wherein the at least one saw tooth includes at least two saw teeth.

10. A blade for use with a reciprocating saw for cutting drywall, the drywall having a first drywall outer layer and an opposing second drywall outer layer, the blade comprising:
a body member having a first body edge and an opposing second body edge, the first and second body edges being substantially parallel;
a blade tip integral with the body member, the blade tip including a first piercing edge angularly offset from the first body edge, and a second piercing edge angularly offset from the second body edge, the blade tip being insertable into the drywall to pierce through the first and second drywall outer layers; and
an engagement element connected to the body member, the engagement element being sized and configured to be releasably engageable with the reciprocating saw;
wherein the second body edge defines a non-serrated first segment extending from the second piercing edge and transitioning to a serrated second segment, the first segment being longer than the second segment.

11. The blade of claim 10 wherein the first piercing edge is substantially orthogonal to the second piercing edge.

12. The blade of claim 11 wherein the serrated second segment includes at least one saw tooth configured to cut the first drywall outer layer upon removal of the blade from the drywall.

13. The blade of claim 12 wherein the at least one saw tooth includes at least two saw teeth.

14. The blade of claim 10 wherein the first piercing edge and the first body edge intersect to form an obtuse angle.

15. The blade of claim 10 wherein the second piercing edge and the second body edge intersect to form an obtuse angle.

16. The blade of claim 10 wherein the second piercing edge and first piercing edge intersect to form a forward point, the second piercing edge defining a second piercing length equal to the distance between the forward point and the second body edge, the first piercing edge defining first piercing length equal to the distance between the forward point and the first body edge, the first piercing length being larger than the second piercing length.

17. The blade of claim 10 wherein the body member includes a pair of opposing lateral body surfaces extending between the first body edge and the second body edge, the pair of opposing lateral body surfaces defining a blade thickness.

18. The blade of claim 17 wherein the blade thickness is substantially uniform.

19. The blade of claim 10 wherein the engagement element includes a mounting aperture sized and configured to be engageable with the reciprocating saw.

20. A blade for use with a reciprocating saw for cutting drywall, the drywall having a first drywall outer layer and an opposing second drywall outer layer defining a drywall thickness therebetween, the blade comprising:
a body member having a first body edge and an opposing, second body edge, the first and second body edges being substantially parallel;
a blade tip integral with the body member, the blade tip including first piercing edge angularly offset from the first body edge, and a second piercing edge angularly offset from the second body edge, the blade tip being insertable into the drywall to pierce through the first and second drywall layers; wherein the second body edge defines a non-serrated first segment extending from the second piercing edge and transitioning into a serrated second segment which terminates at a proximal end; an engagement element
connected to the body member, the engagement element being sized and configured to be releasably engageable with the reciprocating saw; and wherein the second body edge extends from the proximal end opposite the second piercing edge, the blade defining a length from the blade tip to the proximal end, the length being substantially equal to the drywall thickness.

* * * * *